(12) United States Patent
Campagnolo

(10) Patent No.: US 6,718,843 B2
(45) Date of Patent: Apr. 13, 2004

(54) GEAR-SHIFT AND BRAKE-CONTROL ASSEMBLY FOR A RACING BICYCLE, WITH PUSH-BUTTON FOR CONTROLLING THE OPERATING MODE OF A DISPLAY

(75) Inventor: Valentino Campagnolo, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 09/922,725

(22) Filed: Aug. 7, 2001

(65) Prior Publication Data

US 2002/0020246 A1 Feb. 21, 2002

(30) Foreign Application Priority Data

Aug. 8, 2000 (IT) .......................................... TO00A0787

(51) Int. Cl.$^7$ ................................................. F16C 1/10
(52) U.S. Cl. ...................................................... 74/502.2
(58) Field of Search ............................... 74/489, 473.14, 74/473.15, 488, 502.2, 551.8, 500.5, 501.6; 474/78; 192/217; 340/432, 456; 116/28.1; 188/24.11

(56) References Cited

U.S. PATENT DOCUMENTS

| | | | | |
|---|---|---|---|---|
| 5,257,683 A | * | 11/1993 | Romano | 192/217 |
| 5,625,336 A | * | 4/1997 | Yamamoto | 340/432 |
| 6,012,353 A | * | 1/2000 | Kawakami | 74/502.2 |
| 6,073,730 A | * | 6/2000 | Abe | 188/24.11 |
| 6,142,281 A | * | 11/2000 | Campagnolo | 192/217 |

* cited by examiner

Primary Examiner—Chong H. Kim
(74) Attorney, Agent, or Firm—Volpe and Koenig, P.C.

(57) ABSTRACT

A gear-shift and brake-control assembly for a racing bicycle, comprising a first control lever located along and behind the brake lever and a second control lever projecting transversely from the internal side wall of the supporting body of the brake lever, is provided with a push-button for controlling the operating mode of a display associated to the handlebars of the bicycle, which is positioned further back (with reference to the direction of advance of the bicycle) and higher up than the aforesaid second control lever.

16 Claims, 3 Drawing Sheets

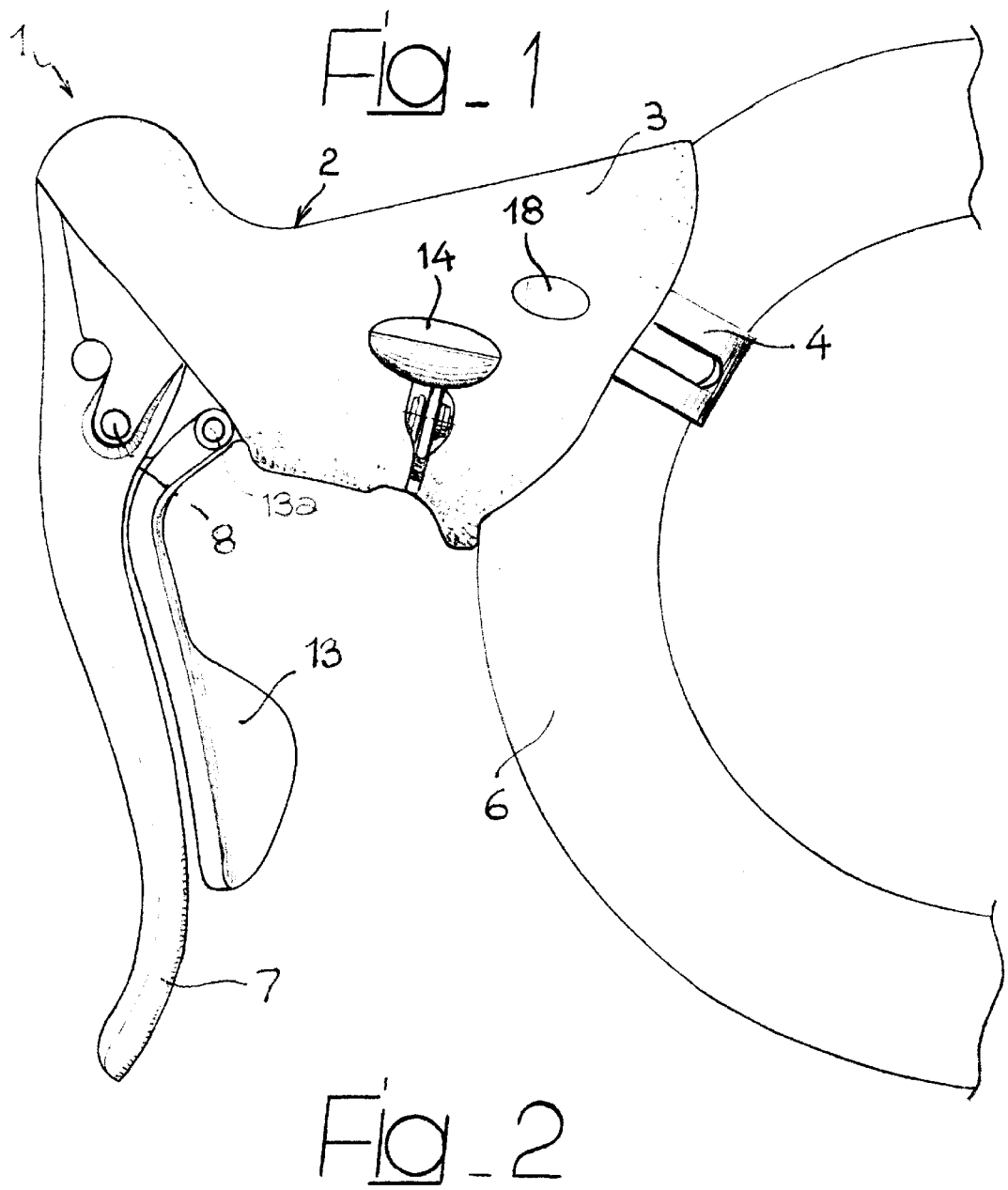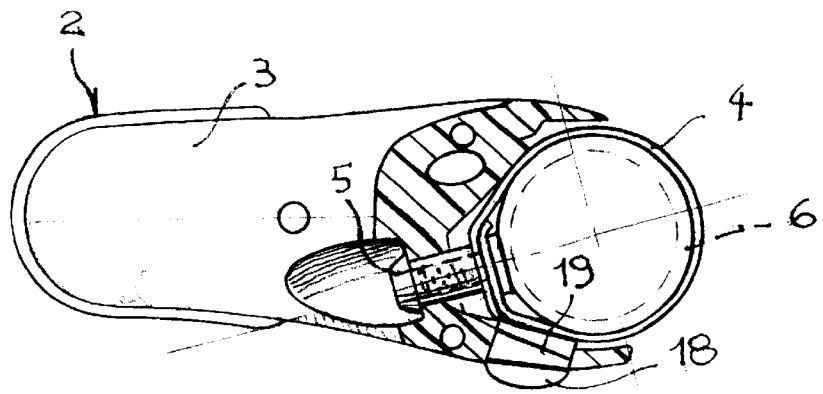

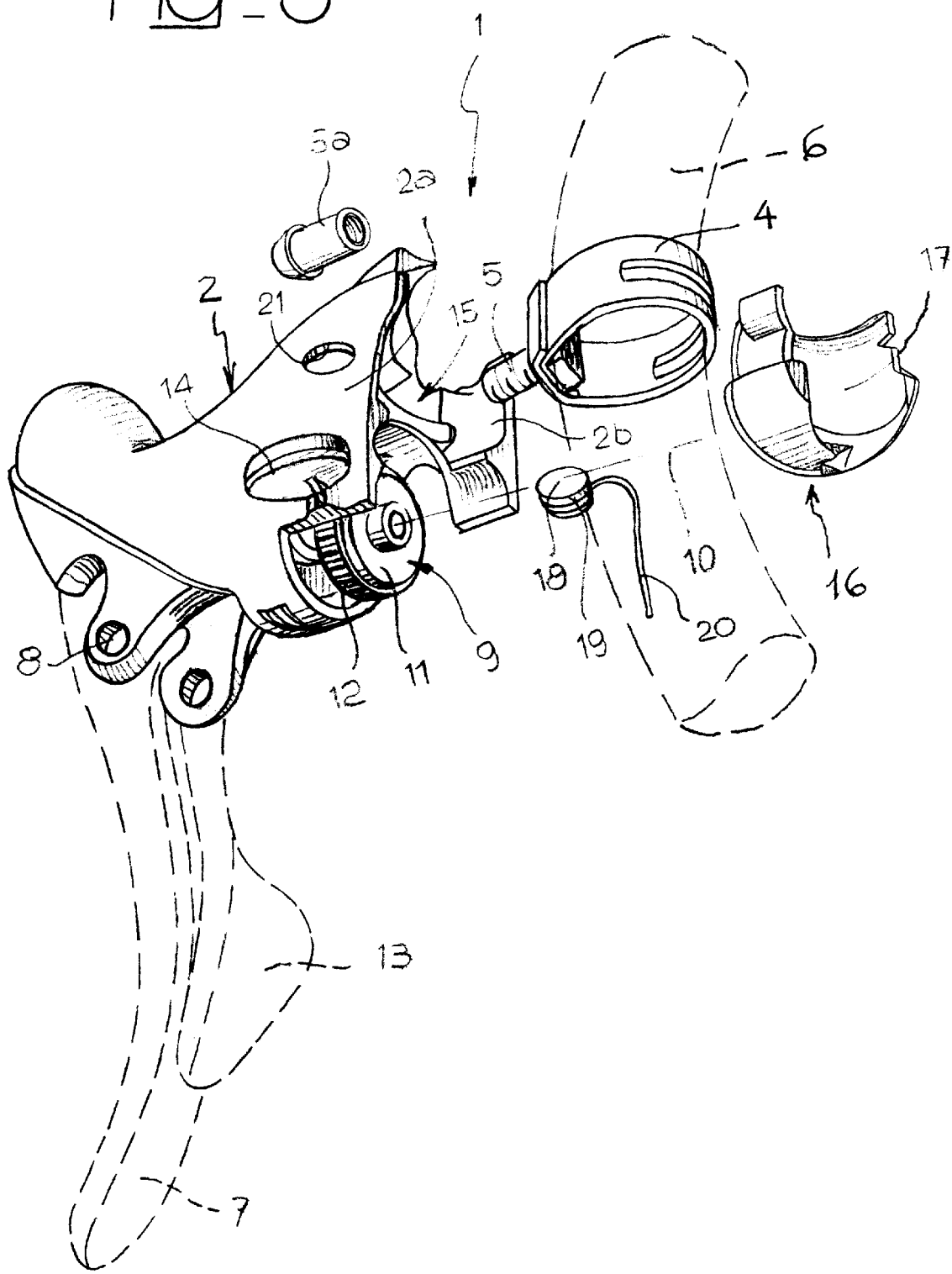

GEAR-SHIFT AND BRAKE-CONTROL ASSEMBLY FOR A RACING BICYCLE, WITH PUSH-BUTTON FOR CONTROLLING THE OPERATING MODE OF A DISPLAY

BACKGROUND OF THE INVENTION

The present invention relates to gear-shift and brake-control assemblies for racing bicycles.

In particular, the invention relates to a gearshift and brake-control set or assembly for a racing bicycle, of the type comprising:

a device for controlling the brake, including:
 a supporting body fixable at the front on a respective end portion of the handlebars of the bicycle; and
 a brake lever, mounted articulated, at its top end, to the aforesaid supporting body and extending downwards, starting from the latter, substantially in a vertical direction, at the front and at a distance from the respective end portion of the handlebars; and a device for controlling the gear-shift, including:
 a rotor mounted so that it can turn in the aforesaid supporting body about an axis that is substantially parallel to the longitudinal direction of the bicycle;
 a pulley carried by the rotor, for winding of a gear-control cable;
 indexing means designed to define a plurality of operating positions of the rotor corresponding to the different gear ratios that can be selected by the gear shift;
 a first gear-control lever located behind and along the brake lever and mounted so that it can oscillate about an axis that is substantially parallel to the longitudinal direction of the bicycle, said first gear-control lever being designed to cause rotation of the rotor in a first direction; and
 a second gear-control lever projecting transversely from an internal side of the supporting body and this too mounted so that it can oscillate about an axis that is substantially parallel to the longitudinal direction of the bicycle, said second gear-control lever being designed to cause rotation of the rotor in a second direction.

An assembly of this type has been produced and sold for several years by the present applicant under the trade mark "ERGOPOWER" and has formed the subject of the U.S. Pat. No. 5,479,776, as well as of the corresponding German patent No. 4 413 610 and of the corresponding French patent No. 2 704 199.

In recent years, there has been an increasingly widespread use in bicycles of an on-board computer with the corresponding display which enables the cyclist to visualize the various operating parameters, among which also the gear ratio selected with the gear shift. It has therefore become necessary to provide transducer devices able to send to an electronic control unit an electrical signal indicating the operating condition of the gear shift.

SUMMARY OF THE INVENTION

The present applicant has presented a gear-shift and brake-control assembly of the type specified above, which also integrates a sensor for detecting the position of the aforesaid rotor for winding the gearshift cable, in his Italian patent application TO98A000492, which was rendered public on Dec. 5, 1999, and in the corresponding German patent application DE19913951 and in the corresponding French patent application 2 779 407. In this previously proposed solution, the assembly also includes a control pushbutton for controlling the operating mode of a display associated to the handlebars of the bicycle, which is mounted in the aforesaid supporting body of the control assembly.

Research studies and practical experience have, however, led the applicant to verify that, on the one hand, the provision of this control button may prove necessary also in the absence of a position sensor for the gear-shift assembly and, on the other hand, this control button must be positioned in such a way that it is easy to operate, without the cyclist having to modify the position of his hand on the handlebars and without involving the risk of an undesired operation of the aforesaid second gear-shift lever.

With the aim of meeting the above requirements, the subject of the present invention is a gear-shift and brake-control assembly of the type referred to at the beginning of the present description, further including a push-button mounted on the supporting body for controlling the operating mode of a display associated to the handlebars of the bicycle, characterized in that the aforesaid supporting body of the control assembly has a side wall facing the inside of the handlebars, in that said push-button is carried by an independent electric-switch body mounted on said side wall, with the push-button projecting through a window of said side wall, and in that said window is located in a position further back (with reference to the direction of advance of the bicycle) and higher up than the position in which the aforesaid second gear-control lever is located.

Thanks to the above-mentioned characteristics, the control button is easy to operate by the cyclist, without any need for him to modify the position of his hand on the handlebars, and without involving the risk of an inadvertent operation of the aforesaid second gear-shift lever.

According to a preferred embodiment, the supporting body of the control assembly is provided with a metal clamp that can be tightened by a screw for fixing to the handlebars, and the body of the electric switch is set between the internal face of the aforesaid side wall and a portion of the clamp. Preferably, the body of the electric switch includes elastic means designed to take up automatically the play between the side wall and the clamp.

BRIEF DESCRIPTION OF THE DRAWINGS

Further characteristics and advantages of the present invention will emerge from the ensuing description, with reference to the attached drawings, provided purely by way of non-limiting example, in which:

FIG. 1 is a side elevation of gear-shift and brake-control assembly according to the invention;

FIG. 2 is a sectional view according to the plane indicated by the line II—II of FIG. 1;

FIG. 3 is an exploded perspective view of the assembly of FIG. 1; and

DETAILED DESCRIPTION OF THE INVENTION

Figure 4:
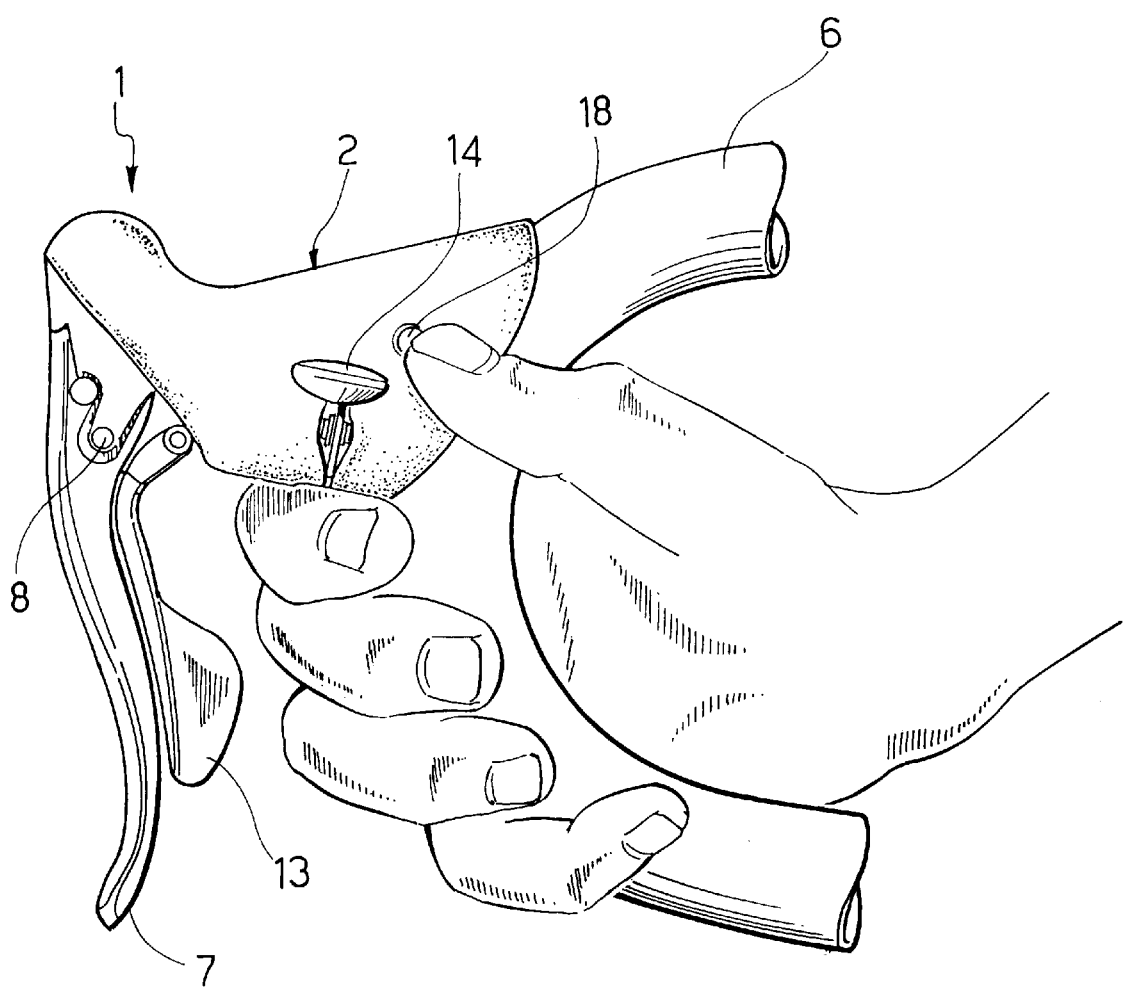
FIG. 4 is a perspective view which shows a possible way for operating a push-button forming part of the assembly according to the invention.

In the drawings, the reference number 1 designates, as a whole, an integrated gear-shift and brake-control assembly for a racing bicycle, basically of the type marketed by the present applicant throughout the world under the trade mark "Ergopower". According to the known art, the said assembly comprises a device for controlling the brake, including a supporting body 2 (see FIGS. 2 and 3) provided with a sheath 3 as external coating and provided with a metal clamp 4, which can be tightened by a screw 5 and a nut 5a, which enable the supporting body 2 to be fixed in front of a respective end portion 6 of the handlebars of the bicycle. The device for controlling the brake further comprises a lever 7 for operating the brake, which has a top end articulated to the supporting body 2 about an axis 8 set in a transverse direction with respect to the longitudinal vertical plane of the bicycle. The operating lever 7 is of course connected to one end of a flexible cable for controlling the brake of the bicycle (not shown in the drawing). As emerges clearly from an examination of FIG. 1, the brake lever 7 extends vertically downwards, starting from the front end of the supporting body 2, in front of and at a distance from the end portion 6 of the handlebars.

Again according to the known art, the assembly 1 comprises a device for controlling the gear change, including a rotor 9 (see FIG. 3) mounted so that it can turn in the aforesaid supporting body 2 about an axis 10 that is substantially parallel to the longitudinal direction of the bicycle. The rotor 9 includes a pulley 11 for winding a gear-control cable (not illustrated) and indexing means, consisting of ring gear 12 co-operating with elastic teeth secured to the supporting body 2 to define a plurality of operating positions of the rotor 9 corresponding to the different gear ratios that can be selected by the gear shift. In addition, the gear-shifting device comprises a first gear-control lever 13 located behind and along the brake lever 7 for operating the brake, which is mounted so that it can oscillate about the aforesaid axis 10 for controlling, by ratchet means, rotation of the rotor 9 in a first direction. The said ratchet means, as likewise the constructional details of the rotor 9 and of the operating lever 13 are not here illustrated in so far as they are made in an identical way to the known device mentioned above, which is, moreover, illustrated in the prior patents filed by the present applicant referred to previously. The said details, considered in themselves, do not, on the other hand, fall within the scope of the present invention, and their elimination from the drawings renders the latter easier and quicker to understand. Again according to the known art, the first lever 13 is moreover articulated about a transverse axis 13a in order not to interfere with the brake lever 7 when the latter is operated.

The gear-shifting device further comprises a second gear-control lever 14, which is mounted so that it can oscillate on the supporting body 2 about the axis 10 and which is designed to cause rotation of the rotor 9 in a second direction by ratchet means of a known type, likewise not illustrated. As may be seen in the figures, the operating lever 14 projects transversely from one side of the supporting body 2, which is facing towards the inside of the handlebars. In use, the cyclist can keep his hand (in the example illustrated, his right hand, in so far as the assembly illustrated is the one mounted at the right-hand end of the handlebars) constantly on the assembly 1 so that he can conveniently operate both the brake lever 7 and the levers 13 and 14, which are respectively for reducing and increasing the gear ratio. Once again according to the known art, the lever 13 is operated by being pushed at the side by the cyclist's fingers from the outside of the handlebars inwards (i.e., from the right to the left in the case of the example illustrated), whilst the lever 14 is operated by being pushed downwards by the cyclist's thumb.

With reference to FIG. 3, the supporting body 2 has at the rear two side walls 2a, 2b delimiting a cavity 15. The reference number 16 designates a block made of plastic that has a profile corresponding to the shaped profile of the walls 2a, 2b so that it can be slotted in between the aforesaid two walls. The block 16 has a rear surface 17, which rests against the end part 6 of the handlebars. If so desired, the said block 16 may be replaced by the body of a potentiometer functioning as a sensor for detecting the angular position of the rotor 9, in accordance with what is envisaged in the Italian patent application TO98000492.

According to the invention, associated to the assembly 1 is a push-button 18 for controlling the operating mode of a display, which is mounted on the handlebars (not illustrated) and which forms part of an electric-switch body 19, connected to the display by means of a cable 20 (see FIG. 2). The body 19 of the electric switch is mounted on the internal face of the side 2a of the supporting body 2 that faces towards the inside of the handlebars, so that the push-button 18 projects through a window 21. In the example illustrated, the window 21, and consequently the pushbutton 18, have an oval profile. According to an important characteristic of the invention, the window 21 is located in a position further back (with reference to the direction of advance of the bicycle) and higher up than the position which the lever 14 assumes in its neutral position. It should be pointed out that both the lever 13 and the lever 14 return to their neutral position after they have been operated. FIG. 3 represents the two levers in their respective neutral positions. As may be seen, if compared to the position assumed by the lever 14, the window 21 for the push-button 18 is located in a higher position or in a position set further back. This characteristic is important for the purpose of enabling, on the one hand, easy operation of the push-button 18 by the cyclist's thumb, and, on the other hand, of preventing any inadvertent or undesired operation of the lever 14, when the intention is to operate the push-button 18, and vice versa.

In the preferred example of embodiment illustrated in the drawings (see in particular FIG. 2), the body 19 of the switch is set between the side 2a of the supporting body 2 and the clamp 4. In addition, the body 19 includes elastic means designed to take up automatically the play between the side wall 2a and the clamp 4, so as to ensure that the push-button projects from the window 21, whatever the condition of tightening of the clamp 4.

Of course, without prejudice to the principle of the invention, the details of construction and the embodiments may vary widely with respect to what is described and illustrated herein purely by way of example, without thereby departing from the scope of the present invention. For example, the push-button 18 could be mounted on the inside instead of on the outside of the body 2.

What is claimed is:

1. A combination gear-shift, brake, and electric display control device for a bicycle having a handlebar, the device comprising:

a support body locatable on the handlebar and having spaced apart sidewalls and a central axis extending between the sidewalls;

an elongated brake lever pivotably attached to the support body about a first pivot axis that is substantially perpendicular to the central axis;

an indexing ratchet rotatably mounted within the support body about a second pivot axis substantially aligned with the central axis to define a plurality of operating positions for a pulley adapted to wind a gear control cable;

a first gear-control lever located under the elongated brake lever and being rotatable about the second pivot axis, whereby the first gear-control lever is movable in a direction substantially orthogonal to a motion path of the elongated brake lever to rotate the indexing ratchet in a first direction;

a second gear-control lever, extending in a direction substantially perpendicular to the elongated brake lever and the first gear-control lever, projecting from a selected sidewall of the support body, the second gear-control lever being rotatable about the second pivot axis to rotate the indexing ratchet in a second direction, opposite from the first direction; and, an independent electric switch body mounted within the support body on the selected sidewall with an associated control button projecting through the selected sidewall approximately midway between the second gear control lever and a portion of the support body adapted to abut the handlebar; and an electric cable operationally connected to the independent electric switch body and the electric display.

2. The device according to claim 1 wherein the independent electric-switch body is mounted on an internal face of the selected sidewall and is located between the selected sidewall and a clamp locatable on the handlebar and engageable with the support body.

3. The device according to claim 1 wherein the independent electric-switch body includes an elastic member which biases the independent electric switch body toward the selected sidewall to maintain the proper position of the independent switch body within the support body.

4. The device according to claim 1 wherein the support body defines a recess for housing a sensor for detecting the angular position of at least one of the indexing ratchet and a rotor.

5. A combination bicycle and a gear-shift, brake, and electric display control device comprising:

a bicycle having a handlebar;

a support body locatable on the handlebar and having sidewalls and a central axis extending between the sidewalls;

an elongated brake lever pivotably attached to the support body about a first pivot axis that is substantially perpendicular to the central axis;

an indexing ratchet rotatably mounted within the support body about a second pivot axis substantially aligned with the central axis to define a plurality of operating positions for a pulley adapted to wind a gear control cable;

a first gear-control lever located under the elongated brake lever and being rotatable about the second pivot axis, whereby the first gear-control lever is movable in a direction substantially orthogonal to a motion path of the elongated brake lever to rotate the indexing ratchet in a first direction;

a second gear-control lever, extending in a direction substantially perpendicular to the elongated brake lever and the first gear-control lever, projecting from a selected sidewall of the support body, the second gear-control lever being rotatable about the second pivot axis to rotate the indexing ratchet in a second direction, opposite from the first direction; and an independent electric switch body mounted within the support body on the selected sidewall with an associated control button projecting through the selected sidewall approximately midway between the second gear control lever and a portion of the support body adapted to abut the handlebar, the button also being located approximately midway between the second gear-control lever and a peripheral surface of the support body facing generally oppositely away from the first gear-control lever; and an electric cable operationally connected to the independent electric switch body and the electric display.

6. The combination of claim 5, further comprising a clamp mounted within the support body and configured to engage the handlebar, wherein the independent electric-switch body is mounted on an internal face of the selected sidewall and located between the selected sidewall and the clamp.

7. The combination of claim 6, wherein the independent electric-switch body comprises an elastic member which biases the independent electric switch body toward the selected sidewall to maintain the proper position of the independent switch body within the support body.

8. The combination assembly according to claim 6, further comprising a block mounted within the support body between the rotor and the clamp, having a face which conforms to the handle bar, which cooperates with the clamp to secure the device to the handle bar, wherein the block is removable to define a recess for housing a sensor for detecting the angular position of the rotor.

9. A gear-shift, electric display, and brake-control control device for a bicycle having a handlebar, the device comprising:

a support body locatable on the housing and having spaced apart sidewalls and a central axis extending between the sidewalls;

an elongated brake lever pivotably attached to the support body about a pivot axis that is substantially perpendicular to the central axis;

a gear-control lever, extending in a direction substantially perpendicular to the elongated brake lever, projecting from a selected sidewall of the support body and rotatable about the central axis; and a control button projecting through the selected side wall approximately midway between the gear control lever and a portion of the handlebar adapted to abut the handlebar for; and an electric display in communication with the control button.

10. A gear-shift, electric display, and brake-control device for a bicycle having a handlebar, the device comprising:

a support body positionable on the handlebar and having spaced apart sidewalls and a central axis extending between the sidewalls;

an elongated brake lever pivotably attached to the support body about a pivot axis that is substantially perpendicular to the central axis;

a gear-control lever, extending in a direction substantially perpendicular to the elongated brake lever, projecting from a selected sidewall of the support body, the gear-control lever being rotatable about the central axis; and an independent electric switch body mounted within the support body on the selected sidewall with an associated control button projecting through the selected side wall approximately midway between the gear control lever and a portion of the support body adapted to abut the handlebar;

an electric cable operationally connected to the independent switch body and the electric display.

11. A combination bicycle and gear-shift, electric display, and brake-control assembly comprising:

a bicycle having a handlebar;

a support body locatable on the handlebar and having spaced apart sidewalls and a central axis extending between the sidewalls;

an elongated brake lever pivotably attached to the support body about a pivot axis substantially perpendicular to the central axis;

a gear-control lever, extending in a direction substantially perpendicular to the elongated brake lever, projecting from a selected sidewall of the support body and rotatable about the central axis; and an independent electric switch body mounted within the support body on the selected sidewall with an associated control projecting through the selected sidewall approximately midway between the gear control lever and a portion of the support body adapted to abut the handlebar and located approximately midway between the gear-control lever and a peripheral surface of the support body facing generally oppositely away from a motion path of the elongated brake lever, wherein the control button is in communication with the electric display which is located remote from the support body.

12. A combination bicycle and gear-shift, electric display, and brake-control assembly comprising:

a bicycle having a handlebar;

a support body locatable on the handlebar and having spaced apart sidewalls and a central axis extending between the sidewalls;

an elongated brake lever pivotably attached to the support body about a pivot axis substantially perpendicular to the central axis;

a gear-control lever, extending in a direction substantially perpendicular to the elongated brake lever, projecting from a selected sidewall of the support body and rotatable about the central axis; and a control button projecting through the selected sidewall of the support body approximately midway between the gear control lever and a portion of the support body adapted to abut the handlebar and located approximately midway between the gear-control lever and a peripheral surface of the support body facing generally oppositely away from a motion path of the elongated brake lever;

an electric cable operationally connects the control button with the electric display which is remotely located from the support body.

13. A combination gear shift, brake, and electric display control device for a bicycle having a handlebar, the device comprising:

a support body locatable on the handlebar and having spaced apart sidewalls and a central axis extending between the sidewalls;

a clamp locatable on the handlebar and engageable with the support body;

an elongated brake lever pivotably attached to the support body about a first pivot axis that is substantially perpendicular to the central axis;

an indexing ratchet rotatably mounted within the support body about a second pivot axis and substantially aligned with the central axis to define a plurality of operating positions for a pulley adapted to wind a gear control cable;

a first gear control lever located under the elongated brake lever and being rotatable about the second pivot axis, wherein the first gear control lever is movable in a direction substantially orthogonal to a motion path of the elongated brake lever to rotate the indexing ratchet in a first direction;

a second gear control lever, extending in a direction substantially perpendicular to the elongated brake lever and the first gear control lever, projecting from a selected sidewall of the support body, the second gear-control lever being rotatable about the second pivot axis to rotate the indexing ratchet in a second direction, opposite from the first direction;

an independent electric switch body mounted within the support body on the selected sidewall with an associated control button projecting through the selected sidewall; and a communication cable operationally connected between the independent electric switch body and an electric display, wherein the independent electric switch body is secured in position between the clamp and the selected sidewall to maintain the control button in an operable position projecting through the selected sidewall.

14. The device of claim 13 wherein the independent electric switch body abuts the clamp and the selected sidewall.

15. The device of claim 13, wherein the independent electric switch body includes an elastic member which biases the independent electric switch body toward the selected sidewall to maintain the proper position of the independent switch body within the support body.

16. A combination gear shift, brake, and electric display control device for a bicycle having a handlebar, the device comprising:

a support body locatable on the handlebar and having spaced apart sidewalls and a central axis extending between the sidewalls;

an elongated brake lever pivotably attached to the support body about a first pivot axis that is substantially perpendicular to the central axis;

an indexing ratchet rotatably mounted within the support body about a second pivot axis and substantially aligned with the central axis to define a plurality of operating positions for a pulley adapted to wind a gear control cable;

a first gear control lever located under the elongated brake lever and being rotatable about the second pivot axis, whereby the first gear control lever is movable in a direction substantially orthogonal to a motion path of the elongated brake lever to rotate the indexing ratchet in a first direction;

a second gear control lever, extending in a direction substantially perpendicular to the elongated brake lever and the first gear control lever, projecting from a selected sidewall of the support body, the second gear-control lever being rotatable about the second pivot axis to rotate the indexing ratchet in a second direction, opposite from the first direction;

an independent electric switch body mounted within the support body on the selected sidewall with an associated control button projecting through the selected sidewall; and a communication cable operationally connected between the independent electric switch body and an electric display, wherein the independent electric switch body includes an elastic member which biases the independent electric switch body toward the selected sidewall to maintain the proper position of the independent switch body within the support body.

* * * * *